United States Patent
Goldin et al.

(10) Patent No.: US 11,581,607 B1
(45) Date of Patent: Feb. 14, 2023

(54) THERMAL MANAGEMENT FOR A CONFORMAL WEARABLE BATTERY

(71) Applicant: Inventus Power, Inc., Woodridge, IL (US)

(72) Inventors: Elijah Brett Goldin, Colorado Springs, CO (US); Ilyas Ayub, Naperville, IL (US); William Mark Batts, Elburn, IL (US); Timothy James Vallaro, Batavia, IL (US); Daniel Paul Rose, Wheaton, IL (US)

(73) Assignee: Inventus Power, Inc., Woodridge, IL (US)

( * ) Notice: Subject to any disclaimer, the term of this patent is extended or adjusted under 35 U.S.C. 154(b) by 0 days.

(21) Appl. No.: 17/491,117

(22) Filed: Sep. 30, 2021

(51) Int. Cl.
*H01M 10/623* (2014.01)
*H01M 50/209* (2021.01)
(Continued)

(52) U.S. Cl.
CPC ....... *H01M 50/209* (2021.01); *H01M 10/425* (2013.01); *H01M 50/24* (2021.01);
(Continued)

(58) Field of Classification Search
CPC .................. H01M 2/1061; H01M 2220/30
See application file for complete search history.

(56) References Cited

U.S. PATENT DOCUMENTS

| 3,993,507 A | 11/1976 | Hardigg |
| 4,053,685 A | 10/1977 | Rowley et al. |

(Continued)

FOREIGN PATENT DOCUMENTS

| CN | 201922162396 | 7/2020 |
| KR | 20080056978 A | 6/2008 |

(Continued)

OTHER PUBLICATIONS

Rogers Corporation, "Poron® ShockSeal™ 4790-79 Foams," visited on Nov. 2, 2020 at <https://rogerscorp.com/Elastomeric%20Material%20Solutions/PORON%20Industrial%20Polyurethanes/PORON%20ShockSeal%204790%2079%20Foams>, 3 pp.

(Continued)

*Primary Examiner* — Cynthia K Walls
(74) *Attorney, Agent, or Firm* — Banner & Witcoff, Ltd.

(57) ABSTRACT

A battery system with a passive thermal management system is formed from a plurality of battery cells arranged on a printed circuit board assembly. In some cases, the printed circuit board assembly may include a flexible printed circuit board that is folded along an axis forming an upper and lower portion of the printed circuit board assembly. The thermal management system may include fire-blocking foam members individually attached to each battery cell. The battery cells may be arranged in a grid-like pattern to allow for a spacing arrangement between the battery cells to keep a failing battery cell from negatively affecting an adjacent battery cell. In addition, the flexible printed circuit card may include a fuse for each battery cell to shut off any current flow to a faulty battery cell if it begins to fail causing current flow to exceed beyond a predetermined current limit. The battery system may be a conformal wearable battery.

10 Claims, 9 Drawing Sheets

(51) Int. Cl.
*H01M 10/42* (2006.01)
*H01M 50/24* (2021.01)
*H01M 50/26* (2021.01)
*H01M 50/502* (2021.01)

(52) U.S. Cl.
CPC ......... *H01M 50/26* (2021.01); *H01M 50/502* (2021.01); *H01M 2200/00* (2013.01)

(56) References Cited

U.S. PATENT DOCUMENTS

| | | |
|---|---|---|
| 4,346,151 A | 8/1982 | Uba et al. |
| 4,658,498 A | 4/1987 | Yamaura et al. |
| 6,376,126 B1 | 4/2002 | Faust et al. |
| 6,410,184 B1 | 6/2002 | Horiuchi et al. |
| 6,528,204 B1 | 3/2003 | Hikmet et al. |
| 6,773,848 B1 | 8/2004 | Nortoft et al. |
| 7,545,649 B2 | 6/2009 | Tan |
| 8,192,863 B2 | 6/2012 | Best et al. |
| 8,767,405 B2 | 7/2014 | Tokuda et al. |
| 8,795,880 B2 | 8/2014 | Matsubara |
| 8,860,372 B2 | 10/2014 | Guang et al. |
| 8,927,137 B2 | 1/2015 | Ayub et al. |
| 9,564,761 B2 | 2/2017 | Hopfer, III et al. |
| 9,640,831 B2 | 5/2017 | Tajima et al. |
| 9,660,225 B2 | 5/2017 | Miyake |
| 9,755,279 B2 | 9/2017 | Moon |
| 9,756,733 B2 | 9/2017 | Drzaic et al. |
| 9,780,421 B2 | 10/2017 | Palanchon et al. |
| 9,843,073 B2 | 12/2017 | Yoneda et al. |
| 9,923,186 B2 | 3/2018 | Tsunaki et al. |
| 9,941,506 B2 | 4/2018 | Hiroki et al. |
| 10,056,584 B2 | 8/2018 | Hwang |
| 10,134,528 B2 | 11/2018 | Stockman |
| 10,224,517 B2 | 3/2019 | Kimura |
| 10,236,492 B2 | 3/2019 | Miyake |
| 10,320,025 B2 | 6/2019 | Hiroki et al. |
| 10,388,939 B2 | 8/2019 | Urano et al. |
| 10,686,167 B2 | 6/2020 | Goto et al. |
| 10,950,913 B1 | 3/2021 | Goldin et al. |
| 11,064,604 B1 | 7/2021 | Goldin et al. |
| 11,108,105 B2 | 8/2021 | Takahashi et al. |
| 2002/0017700 A1 | 2/2002 | Mori et al. |
| 2002/0127362 A1 | 9/2002 | Jansen et al. |
| 2004/0009334 A1* | 1/2004 | Miyamoto .......... H01M 50/531 428/209 |
| 2005/0253553 A1* | 11/2005 | Phillips ................. H01M 50/24 320/112 |
| 2006/0210841 A1 | 9/2006 | Wallace et al. |
| 2008/0241677 A1 | 10/2008 | Garcia Alberola |
| 2008/0241680 A1 | 10/2008 | Lee et al. |
| 2009/0253034 A1 | 10/2009 | Nedelec |
| 2009/0291361 A1 | 11/2009 | Scorziello |
| 2010/0167117 A1 | 7/2010 | Maroon et al. |
| 2013/0295434 A1* | 11/2013 | Ayub ................. H01M 50/502 429/157 |
| 2014/0212695 A1 | 7/2014 | Lane et al. |
| 2014/0216814 A1 | 8/2014 | Suzuki |
| 2015/0037634 A1 | 2/2015 | Malcolm et al. |
| 2015/0044511 A1 | 2/2015 | Kim et al. |
| 2015/0093982 A1* | 4/2015 | Bailey ............... H01M 10/6562 454/184 |
| 2015/0194697 A1 | 7/2015 | Hung et al. |
| 2015/0280186 A1 | 10/2015 | Fan |
| 2015/0311495 A1 | 10/2015 | Wang |
| 2016/0003463 A1 | 1/2016 | Rodinger et al. |
| 2016/0156012 A1 | 6/2016 | Takahashi et al. |
| 2016/0218387 A1 | 7/2016 | Tajima |
| 2016/0233695 A1 | 8/2016 | Hopfer, III et al. |
| 2017/0018784 A1 | 1/2017 | Yun et al. |
| 2017/0025669 A1 | 1/2017 | Urano et al. |
| 2017/0079139 A1 | 3/2017 | Wu |
| 2017/0235922 A1 | 8/2017 | Weast et al. |
| 2018/0026235 A1 | 1/2018 | Akhmad |
| 2018/0062197 A1 | 3/2018 | Thiel et al. |
| 2018/0083233 A1 | 3/2018 | Foung et al. |
| 2018/0102518 A1 | 4/2018 | Thiel et al. |
| 2018/0175346 A1 | 6/2018 | Schmid-Schoenbein |
| 2018/0223070 A1* | 8/2018 | O'Neil ................ H01M 10/613 |
| 2018/0261900 A1 | 9/2018 | Kim et al. |
| 2018/0301741 A1 | 10/2018 | Kumar et al. |
| 2019/0044197 A1* | 2/2019 | Ota ..................... H01M 10/425 |
| 2019/0088979 A1 | 3/2019 | Grady et al. |
| 2019/0090350 A1 | 3/2019 | Kumar |
| 2019/0133303 A1 | 5/2019 | Thiel et al. |
| 2019/0237832 A1 | 8/2019 | Ju et al. |
| 2019/0305303 A1 | 10/2019 | Yebka et al. |
| 2019/0326647 A1 | 10/2019 | Kawai et al. |
| 2020/0127259 A1 | 4/2020 | Yoshida et al. |
| 2020/0227693 A1 | 7/2020 | Enomoto |
| 2020/0243808 A1 | 7/2020 | Harutyunyan et al. |
| 2020/0245495 A1 | 7/2020 | Yi et al. |
| 2020/0403566 A1 | 12/2020 | Yamaai et al. |

FOREIGN PATENT DOCUMENTS

| | | |
|---|---|---|
| WO | 08023199 A1 | 2/2008 |
| WO | 17209052 A1 | 12/2017 |
| WO | 2019/025235 A1 | 2/2019 |

OTHER PUBLICATIONS

Inventus Power, "Conformal Wearable Batteries Safe, 'Flexible, Wearable Power Designed to Increase Mission Effectiveness'," visited on Nov. 4, 2020 at <https://inventuspower.com/conformal-wearable-batteries/>, pp. 3.

Rebecca Cragun, et al., "Li-Ion Conformal Wearable Battery," EaglePicher Technologies, LLC visited on Feb. 9, 2020 at <http://www.powersourcesconference.com/Power%20Sources%202018%20Digest/docs/34-2.pdf>, pp. 577-580.

Eaglepicher Technologies, "Rechargeable Conformal Battery", visited on Feb. 9, 2020 at <https://www.eaglepicher.com/sites/default/files/SLB-101%20061419.pdf>, pp. 2.

Jul. 1, 2021—(WO) ISR & WO—App. No. PCT/US2021/022377.
Dec. 8, 2022—(WO) ISR & WO—App. No. PCT/US2022/077264.

* cited by examiner

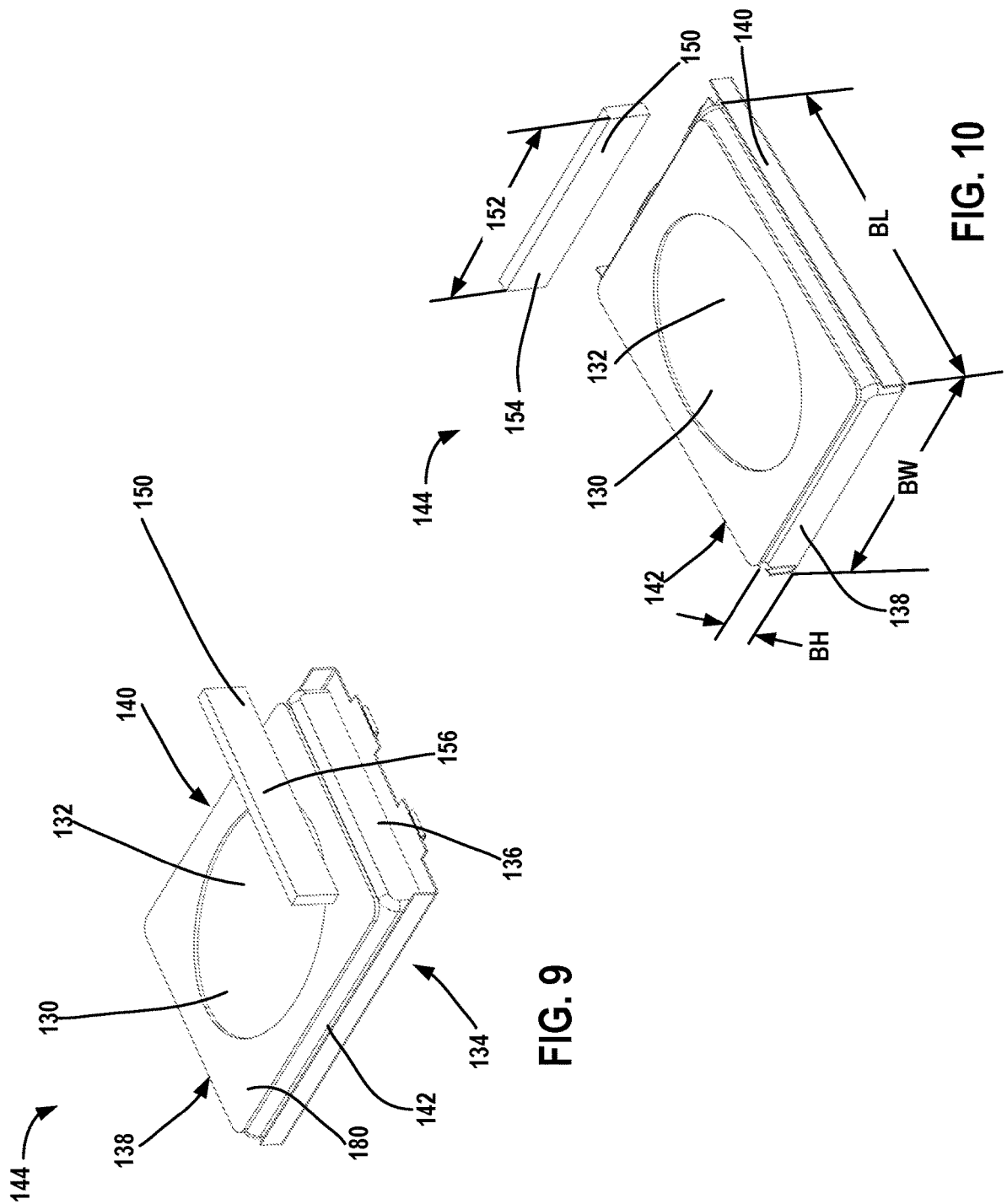

THERMAL MANAGEMENT FOR A CONFORMAL WEARABLE BATTERY

CROSS-REFERENCE TO RELATED APPLICATIONS

This application is related to U.S. patent application Ser. No. 17/202,109, entitled "Conformal Wearable Battery" filed on Mar. 15, 2021 and also related to U.S. patent application Ser. No. 17/377,071, entitled "Conformal Wearable Battery" filed on Jul. 15, 2021. All of the above listed applications are herein incorporated by reference in their entirety.

FIELD

Aspects described herein generally relate to portable electrical power storage systems. More specifically, aspects of this disclosure relate to thermal management for a portable electrical power storage system.

BACKGROUND

Portable battery systems may be utilized to provide mobile and/or remote location electrical power. Integrated communications equipment and/or weapons gear utilized, for example, by law enforcement and/or military personnel requires increasingly high levels of power storage carried proximate the user's body. Methods of increasing power storage capability in a device, such as a conformal wearable battery (CWB) are to include additional battery cells and/or use higher capacity battery cells. However, these solutions may unacceptably increase the size and/or weight of the resulting systems, reducing mobility.

In addition, batteries may come in different shapes and sizes depending on their intended usage. In some instances, the batteries may be desired to flex or bend and may be exposed to harsh environments. Some batteries may be arranged as packages of battery cells that are assembled together to provide a predetermined power output, while maintaining a portable size and weight. These battery cells may be arranged in a durable and sealed housing to protect the battery cells from damage. As these battery cells discharge, heat may be produced, and in some cases due to internal and/or external factors, one or more of the battery cells may become damaged or unstable that can cause the cell to go into an exothermic reaction called thermal runaway, which may cause a fire. A thermal management system may allow the mobile electrical power storage package to operate safely.

BRIEF SUMMARY

Aspects of the disclosure provide solutions that address and overcome technical problems associated with minimizing size of a portable battery system (e.g. a conformal wearable battery system).

Some aspects of this disclosure may relate to a conformal wearable battery (CWB) that includes: a flexible printed circuit board assembly (PCBA) comprising: (a) a flexible printed circuit board (PCB) and (b) a plurality of battery cells connected to the flexible PCB in a grid-like pattern, each battery cell of the plurality of battery cells comprising a front side, a rear side opposite the front side, a first side extending between the front side and the rear side, a second side opposite the first side, a third side extending between the first side and the second side, and a fourth side opposite the third side and where each battery cell of the plurality of battery cells is a lithium-ion pouch cell comprising a seal on the first side of each battery cell. The CWB may also include a plurality of fire-blocking foam members, where a first fire-blocking foam member of the plurality of fire-blocking foam members is located adjacent to the first side of a first battery cell of the plurality of battery cells. A first battery terminal and a second battery terminal may extend from the first side of each battery cell. The first fire-blocking foam member may have a generally cuboid shape. In addition, the first fire-blocking foam member may have a surface area, on an inward facing side of the first fire-blocking foam member, that is at least 90 percent of a surface area of the first side of the first battery cell. The first fire-blocking foam member may be one or both of thermally insulating and electrically insulating. The first fire-blocking foam member may be formed from a silicone based material. The first fire-blocking foam member may have an inward facing surface that faces the first side of the first battery cell and an outward facing surface opposite the inward facing surface, where a second battery cell spacing defined as a shortest distance between the first side of the first battery cell to a second side of a second adjacent battery cell, and the foam thickness is within a range of 25 percent and 75 percent of the second battery cell spacing. In some examples, a fuse may be arranged on the flexible PCB for each battery cell connected to the flexible PCB, such that when a first battery cell of the plurality of battery cells has a current flow greater than a predetermined current flow limit, a first fuse corresponding to the first battery cell opens to shut off an electrical connection between the first battery cell and the flexible PCB. The plurality of battery cells may include a first battery cell spacing from the fourth side of the first battery cell to the third side of the adjacent second battery cell adjacent to the first battery cell is within a range of 6 percent and 11 percent of a width of the first battery cell. The CWB may include a housing that receives the PCBA, where the housing is formed from a polymeric material comprising a flame retardant additive.

Other aspects of this disclosure may disclose a conformal wearable battery comprising: a flexible printed circuit board assembly (PCBA) comprising: a flexible printed circuit board (PCB) with a plurality of battery cells connected to the flexible PCB in a grid-like pattern, where each battery cell of the plurality of battery cells has a front side, a rear side opposite the front side, a first side extending between the front side and the rear side, a second side opposite the first side, a third side extending between the first side and the second side, and a fourth side opposite the third side. Each battery cell of the plurality of battery cells may comprise a lithium-ion pouch cell that comprises a seal on the first side of each battery cell. A fuse may be arranged on the flexible PCB for each battery cell of the plurality of battery cells on the flexible PCBA. When a first battery cell of the plurality of battery cells has a current flow greater than a predetermined current flow limit, a first fuse corresponding to the first battery cell may open to shut off an electrical connection between the first battery cell and the flexible PCB. The CWB may include a plurality of fire-blocking foam members, where a first fire-blocking foam member of the plurality of fire-blocking foam members is located adjacent to the first side of the first battery cell forming a battery cell module. The CWB may include a housing that includes a housing member and an interior cavity that receives the PCBA, where a wall of the housing member includes a first channel and a second channel oriented parallel to each other, and a third channel and a fourth channel that intersect the first and second channels. The first channel, the second channel, the third channel, and the fourth channel may have interior surfaces that form a perimeter wall around an internal receiver in the housing member that receives the first battery cell of the plurality of battery cells. In addition, the housing member is formed from a polymeric material comprising a flame retardant additive.

Additional aspects of this disclosure may relate to an electronic system comprising: (a) an upper housing member; (b) a lower housing member that connects to the upper housing member forming an interior cavity; and (c) a printed circuit board assembly (PCBA) received within the interior cavity comprising: (1) a printed circuit board (PCB) and (2) a plurality of battery cells connected to the PCB in a grid-like pattern, where each battery cell of the plurality of battery cells has a front side, a rear side opposite the front side, a first side extending between the front side and the rear side, a second side opposite the first side, a third side extending between the first side and the second side, and a fourth side opposite the third side. Each battery cell of the plurality of battery cells may comprise a lithium-ion pouch cell comprising a seal on the first side of each battery cell. Additionally, the rear side of each battery cell of the plurality of battery cells may be physically affixed to the PCB. A plurality of fire-blocking foam members, wherein a first fire-blocking foam member of the plurality of fire-blocking foam members is located adjacent to the first side of a first battery cell of the plurality of battery cells. The CWB may also include a fuse arranged on the PCB for each battery cell of the plurality of battery cells on the PCBA, where when a first battery cell of the plurality of battery cells has a current flow greater than a predetermined current flow limit, a first fuse corresponding to the first battery cell may open to shut off an electrical connection between the first battery cell and the PCB. The first fire-blocking foam member may have an inward facing surface that faces the first side of the first battery cell and an outward facing surface opposite the inward facing surface defining a foam thickness, where the foam thickness is within a range of 25 percent and 75 percent of the second battery cell spacing. The second battery cell spacing may be defined as a shortest distance between the first side of the first battery cell to a second side of a second adjacent battery cell.

Other aspects of this disclosure may relate to an electronic system comprising: (a) an upper housing member; (b) a lower housing member that connects to the upper housing member forming an interior cavity; and (c) a printed circuit board assembly (PCBA) received within the interior cavity comprising: (1) a printed circuit board (PCB) and (2) a plurality of battery cells connected to the PCB in a grid-like pattern, where each battery cell of the plurality of battery cells has a front side, a rear side opposite the front side, a first side extending between the front side and the rear side, a second side opposite the first side, a third side extending between the first side and the second side, and a fourth side opposite the third side. Each battery cell of the plurality of battery cells may comprise a lithium-ion pouch cell comprising a seal on the first side of each battery cell. Additionally, the rear side of each battery cell of the plurality of battery cells may be physically affixed to the PCB. A first group of battery cells of the plurality of battery cells electrically may be connected in parallel forming a first battery cell string and a second group of battery cells of the plurality of battery cells electrically connected in parallel forming a second battery cell string, where the first group of battery cells and the second group of battery cells are connected in series. In addition, a plurality of fuses may be arranged on the PCB, where each battery cell may be connected to an individual fuse of the plurality of fuses. When a first battery cell of the first battery cell string has a current flow greater than a first predetermined current flow limit, a first fuse of the plurality of fuses corresponding to the first battery cell of the first battery cell string may open to shut off an electrical connection between the first battery cell of the first battery cell string and the PCB. The electronic system may also include a plurality of fire-blocking foam members, where a first fire-blocking foam member of the plurality of fire-blocking foam members is located adjacent to the first side of a first battery cell of the plurality of battery cells. And when a second battery cell of the second battery cell string has a current flow greater than a second predetermined current flow limit, a second fuse corresponding to the second battery cell of the second battery cell string may open to shut off an electrical connection between the second battery cell and the PCB. In some cases, the first predetermined current flow limit may be equal to the second predetermined current flow limit. The first fire-blocking foam member has an inward facing surface that faces the first side of the first battery cell and an outward facing surface opposite the inward facing surface defining a foam thickness, where a second battery cell spacing defined as a shortest distance between the first side of the first battery cell to a second side of a second adjacent battery cell, and the foam thickness is within a range of 25 percent and 75 percent of the second battery cell spacing. The upper housing member and the lower housing member may be formed from a polymeric material comprising a flame retardant additive. A first battery cell spacing from the fourth side of the first battery cell to the third side of a second battery cell adjacent to the first battery cell is within a range of 6 percent and 11 percent of a width of the first battery cell. A wall of the upper housing member includes a first channel and a second channel oriented parallel to each other, and a third channel and a fourth channel that intersect the first and second channels, wherein the first channel, the second channel, the third channel, and the fourth channel have interior surfaces that form a perimeter wall around an internal receiver in the upper housing member that receives the first battery cell of the plurality of battery cells, where a perimeter wall height may be within a range of 35 percent and 65 percent of a height of the first battery cell.

Another aspects of this disclosure may relate to an electronic system comprising: (a) an upper housing member; (b) a lower housing member that connects to the upper housing member forming an interior cavity; and (c) a printed circuit board assembly (PCBA) received within the interior cavity comprising: (1) a printed circuit board (PCB) and (2) a plurality of battery cells connected to the PCB in a grid-like pattern, where each battery cell of the plurality of battery cells has a front side, a rear side opposite the front side, a first side extending between the front side and the rear side, a second side opposite the first side, a third side extending between the first side and the second side, and a fourth side opposite the third side. Each battery cell of the plurality of battery cells may comprise a lithium-ion pouch cell comprising a seal on the first side of each battery cell. Additionally, the rear side of each battery cell of the plurality of battery cells may be physically affixed to the PCB. A plurality of fire-blocking foam members, wherein a first fire-blocking foam member of the plurality of fire-blocking foam members is located adjacent to the first side of a first battery cell of the plurality of battery cells. The CWB may also include a fuse arranged on the PCB for each battery cell of the plurality of battery cells on the PCBA, where when a first battery cell of the plurality of battery cells has a current flow greater than a predetermined current flow limit, a first fuse corresponding to the first battery cell may open to shut off an electrical connection between the first battery cell and the PCB. The first fire-blocking foam member may have an inward facing surface that faces the first side of the first battery cell and an outward facing surface opposite the inward facing surface defining a foam thickness, where the foam thickness is within a range of 25 percent and 75 percent of the second battery cell spacing. The second battery cell spacing may be defined as a shortest distance between the first side of the first battery cell to a second side of a second adjacent battery cell.

BRIEF DESCRIPTION OF THE DRAWINGS

The present disclosure is illustrated by way of example and not limited in the accompanying figures in which like reference numerals indicate similar elements and in which:

FIG. 9 illustrates an exploded perspective view of a battery cell module of the printed circuit board assembly of FIG. 8 according to aspects described herein;

FIG. 10 illustrates an exploded perspective view of the battery cell module of FIG. 9 according to aspects described herein;

DETAILED DESCRIPTION

Figure 1:
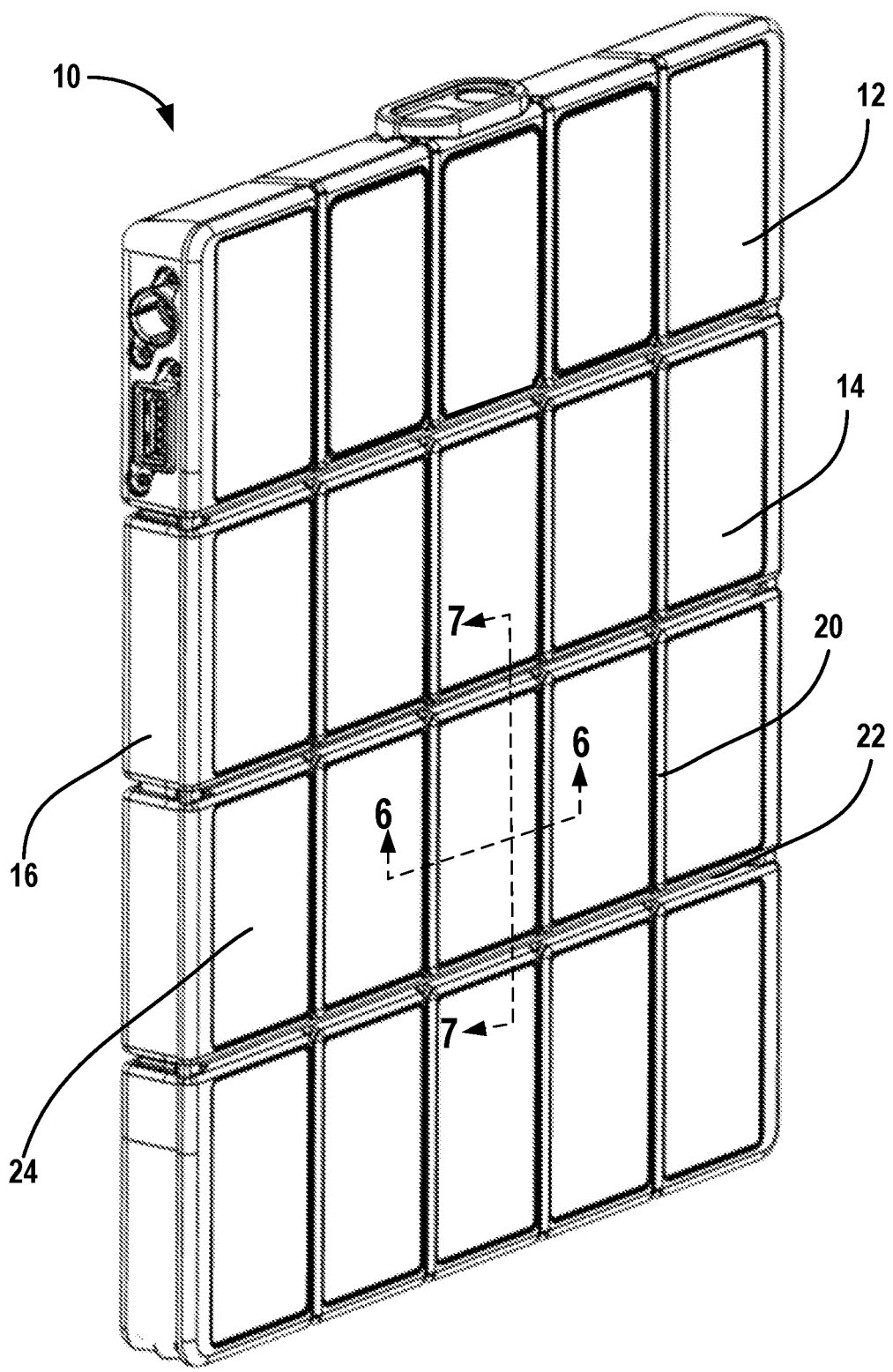
FIG. 1 illustrates a front perspective view of a portable battery system according to aspects described herein.

In the following description of various illustrative arrangements, reference is made to the accompanying drawings, which form a part hereof, and in which is shown, by way of illustration, various arrangements in which aspects of the disclosure may be practiced. It is to be understood that other arrangements may be utilized, and structural and functional modifications may be made, without departing from the scope of the present disclosure. It is noted that the accompanying drawings may not be drawn to scale.

It is noted that various connections between elements are discussed in the following description. It is noted that these connections are general and, unless specified otherwise, may be direct or indirect, and that the specification is not intended to be limiting in this respect.

A portable battery system or a rechargeable conformal wearable battery (CWB) may be worn by a user to power electronic devices that the user carries. The CWB may be subjected to a multitude of environmental conditions such as harsh shock and vibration, moisture exposure, and extreme temperatures. To provide a desired power output, the CWB may include a plurality of battery cells, each with a rated power capacity and when electrically connected, may allow the CWB to provide a desired power output. The battery cells of the CWB may be received in a housing that is sealed to facilitate longer battery life and utility for the user regardless of environmental conditions it may encounter.

A CWB may include an array of a first quantity of battery cells disposed adjacent to one another in a horizontal direction and a second quantity of battery cells disposed adjacent to one another in a vertical direction. The array of battery cells may be arranged in a grid-like pattern. Each of the battery cells may be encased or housed in a battery cell housing (e.g., a pouch, a metal enclosure, etc.) separate from other battery cells. A battery cell as described herein may include a plurality of individual battery cell elements that are electrically connected together to form a compound battery cell that electrically performs as a single unit. Each of the battery cells may be physically connected to adjacent battery cells by flexible elements (e.g., a flexible printed circuit board (PCB)). The array of battery cells may be attached to the flexible PCB to form a flexible printed circuit board assembly (PCBA) that is secured in a housing, where the housing may be able to flex, to form the CWB. The CWB may then be able to flex to generally conform to a surface outline or shape of a user wearing the CWB. For example, the housing of the CWB may include one or more grooves or flex lines along which the CWB may flexibly conform to a shape of an object adjacent to the CWB, such as a portion of a user's body. The CWB may be required to meet one or more of the requirements of MIL-PRF-32383.

One or more of the battery cells may include a positive-charge electrical terminal (a cathode) and a negative-charge electrical terminal (an anode) that are electrically connected with the flexible PCB, which also connects a first battery cell to a second battery cell within the array of battery cells to provide electrical power to electrical devices that are connected to the CWB. The CWB may include a set of positive-charge electrical terminals and negative-charge electrical terminals that are shared among the array of battery cells. The array of battery cells may be connected together to route electrical current through the flexible PCB to the set of positive-charge electrical terminals and negative-charge electrical terminals that are shared among the plurality of the battery cells. The positive-charge electrical terminal and the negative-charge electrical terminal may provide an electrical current that passes through an electrically conductive path, for example, through an electronic device, via transfer of electrons through the electrically conductive path between a positive-charge electrical terminal and a negative-charge electrical terminal on the exterior of the CWB. The array of battery cells may be electrically coupled together, for example, in series or in parallel.

In some cases, each battery cell may be provided in a package, such as a button cell, a prismatic cell, a pouch cell, and a cylindrical cell. For example, a pouch cell type battery, which may be formed of electrodes and a liquid, gel, or solid electrolyte that are stacked in layers or laminations and enclosed in a foil envelope housing, which is then sealed. The positive-charge terminal and the negative-charge terminal may each include a conductive region that passes between the interior of the foil envelope housing and the exterior of the foil envelope battery cell housing.

The CWB housing may secure a plurality of the battery cells within an interior region, which may be formed from a molding process such as injection molding. The CWB housing may be formed of a polymeric material, for example. The CWB housing may be sealed to prevent ingress of solid material and/or liquid material, for example, according to an IP67 rating, IP68 rating, or other ingress protection rating. The CWB housing may include a plurality of electrically conductive contacts and/or connectors that may pass between the interior region of the CWB housing and the exterior of the CWB housing. The IP67 rating is specified by the Ingress Protection Code (IP Code) IEC standard 60529. The equivalent European standard is EN 60529. The IP Code also may be referred to as the International Protection Code. The IP Code classifies and rates a degree of ingress protection provided by mechanical casings and electrical enclosures for electronic equipment against intrusion, dust, accidental contact, and liquid (e.g., water). In the IP67 rating, the first digit (i.e., '6') specifies a level of protection offered against ingress of solid objects, while the second digit (i.e., '7') specifies a level of protection offered against ingress of liquids. The larger the value of the digit specifying the level of protection, the greater the amount of protection offered. For example, an IP67 rating specifies total protection against dust ingress and protection against short periods of immersion in water. An IP68 rating specifies dust resistance and immersion in 1.5 meters of freshwater for up to 30 minutes duration.

Figure 2:
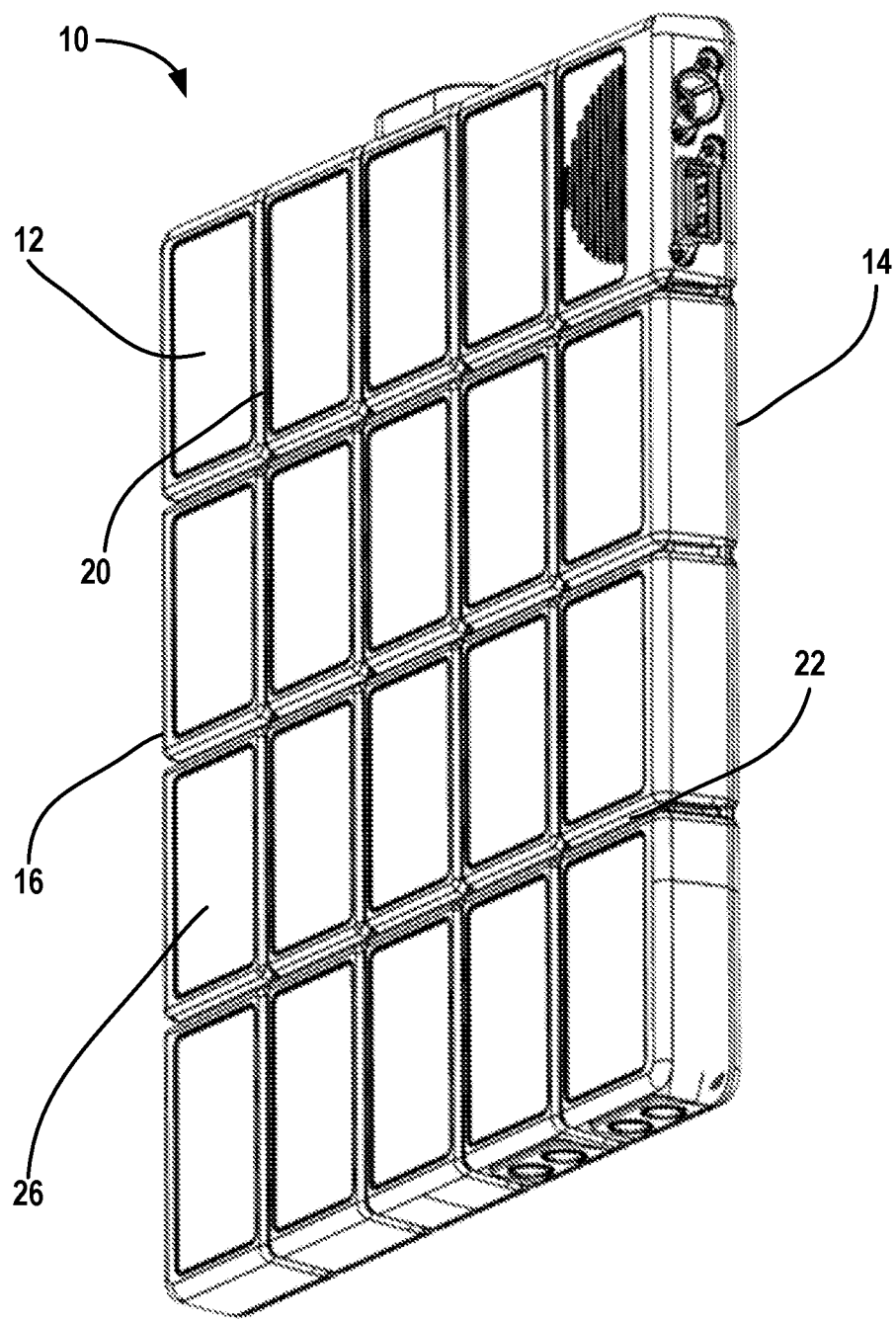
FIG. 2 illustrates a rear perspective view of the portable battery system of FIG. 1 according to aspects described herein.
Figure 3:
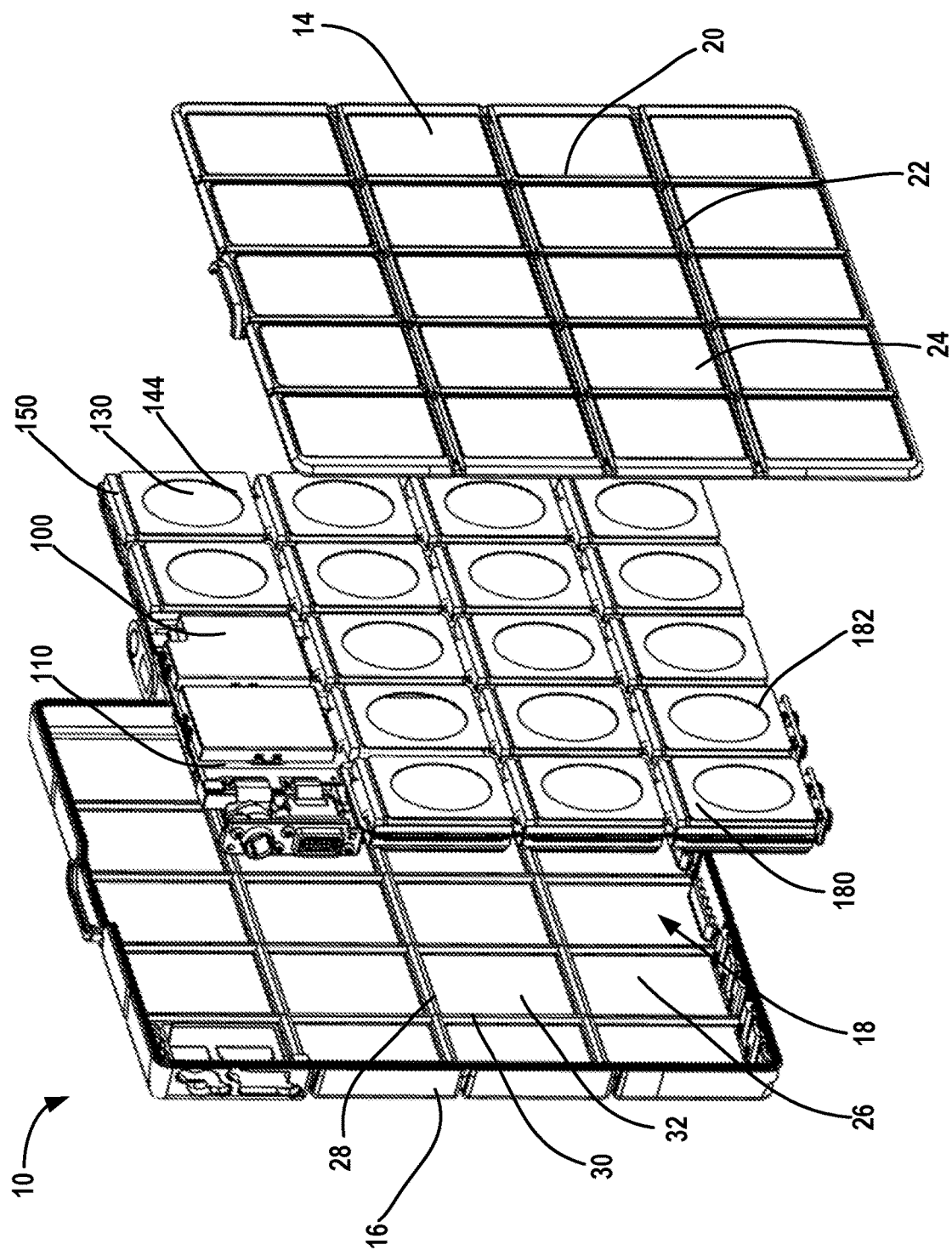
FIG. 3 illustrates a front exploded perspective view of the portable battery system of FIG. 1 according to aspects described herein.

FIGS. 1-3 illustrate an exemplary portable battery system as a conformal wearable battery (CWB) 10. In some examples, the CWB 10 may be provided in a form factor easily carried by a person, such as within a pocket or other means of securing the CWB 10 to a person's clothing, uniform, or the like. The CWB 10 may have an external housing 12. The housing 12 may include an upper housing member 14 and a lower housing member 16 that may be connected together to form an interior cavity 18. As shown in FIG. 3, the CWB 10 may include a flexible printed circuit board assembly (PCBA) 100 that is received into the interior cavity 18 of housing 12, where the flexible PCBA 100 includes a flexible printed circuit board (PCB) 110 with a plurality of battery cells 130 connected both electrically and physically to the flexible PCB 110. The upper housing member 14 and the lower housing member 16 may be sealed together along the perimeter to protect the flexible PCBA 100 by preventing ingress of solid material and/or liquid material as well as protecting the flexible PCBA 100 and its battery cells 130 from impacts, since a damaged battery cell 130 may be a fire hazard and/or could render the CWB 10 inoperable.

As shown in FIG. 3, the flexible PCBA 100 may include a flexible printed circuit board (PCB) 110 with a plurality of battery cells 130 connected both electrically and physically to the flexible PCB 110. To provide the specified power output, while also providing flexibility for conforming to a shape of person's body or equipment when carried, a matrix of battery cells 130 may be arranged on, and affixed to, the flexible PCB 110. To fit within the housing 12 of the CWB 10, the flexible printed circuit board 110 may have a bend axis 112 (e.g. a centerline) that facilitates folding of the flexible PCB 110 to form an upper portion 114 of the flexible PCB 110 and a lower portion 116 of the flexible PCB 110. Each portion 114, 116 may be substantially the same size (i.e., same surface area). Each battery cell 130 may be mounted on an outward facing surface 118A, 118B of each respective portion 114, 116 of the flexible printed circuit board 110 while the electrical connections may be made on an inward facing surface 120A, 120B of the respective upper and lower portions 114, 116 of the folded flexible PCB 110. A central shock-attenuating or shock-absorbing member 190 may be positioned between the upper portion 114 of the flexible PCB 110 and the lower portion 116 of the flexible PCB 110 to prevent the upper portion 114 from contacting the lower portion 116. The central shock-attenuating member 190 may absorb or dampen any shock and/or vibrational loading the CWB 10 may receive while also providing electrical insulation for the electrical contacts.

As an illustrative example, each battery cell 130 of the plurality of battery cells may be a pouch cell type battery (i.e., a packaged polymer lithium-ion battery or similar type battery). For instance, each battery cell 130 may include a pouch cell portion and a foil portion that wraps around at least three sides of the pouch cell portion. The foil portion may have a length that is greater than a length of the pouch cell portion. In addition, the foil portion may contact the sides of the pouch cell portion across the width of the battery cell 130. Each battery cell 130 (e.g., polymer battery cell) may have a non-cylindrical shape and may have a generally rectangular cuboid shape or a substantially parallelepiped shape. In addition, each battery cell 130 of the plurality of battery cells may have has a front side or outward facing surface 132, a rear side 134 opposite the front side 132, a first side 136 extending between the front side 132 and the rear side 134, a second side 138 opposite the first side 136, a third side 140 extending between the first side 136 and the second side 138, and a fourth side 142 opposite the third side 140. In some examples, each battery cell 130 may be a lithium-ion pouch cell, where the lithium-ion pouch cell is sealed on the first side 136 of the battery cell 130. The positive-charge electrical terminal and the negative-charge electrical terminal may exit from or near the first side 136 of the battery cell 130 in a direction such that the terminals extend away from the first side 136 of the battery cell 130. In some examples, the terminals of each battery cell 130 may electrically connect to the flexible PCB 110 on an inward facing surface 120A, 120B of the respective upper and lower portions 114, 116 of the folded PCB 110. In some cases, one or more of the battery cells 130 may have a different packaging format, such as a prismatic cell, a cylindrical cell, and/or the like.

In an illustrative example, the dimensions of the battery cell 130 may be about 43 mm in length (BL), about 34 mm in width (BW), and about 6 mm in height (BH), but battery cells of other dimensions may be used within the scope of this disclosure. Additionally, each battery cell 130 may weigh between 22.5 grams and 24.5 grams (i.e., 23.5 grams) and may have an energy storage capacity between 1400 mAh and 1500 mAh (i.e., about 1,435 mAh). The size, weight, and energy storage capacity of each battery cell 130 of the CWB 10 may be designed such that the overall size, weight, and energy storage capacity of the flexible PCBA 100 for the CWB 10 meets an energy storage capacity specification, weight specification, and/or size specification for a CWB 10. For example, the height, width, and length of each battery cell 130 may be designed, at least in part, to meet a flexibility requirement of the CWB 10. Additionally, the size, and/or shape of the battery cells 130 may allow for a specified number of battery cells (e.g., about 36 battery cells) and/or configuration of the battery grid such that the energy capacity for the CWB 10 may be at least 148 Watt-hours (Wh) (e.g., about 150 Wh, about 170 Wh, about 190 Wh, about 200 Wh, etc.) and/or where the maximum weight of the CWB 10 is less than a specified maximum weight (e.g., about 2.6 pounds). In some cases, a configuration of the battery cells 130 of the CWB 10 may allow the CWB 10 to output a voltage between about 10 and about 20 V, (e.g., about 14.8V) within a specified size and/or shape of the CWB 10. For example, an illustrative CWB 10 may have an overall dimensions of between about 8.5 in. and 9.0 inches (i.e., about 8.7 in.)×between about 7.5 in and 8 in. (i.e., about 7.66 in.)×between about 0.5 in. and 0.8 in. (i.e., 0.70 in.).

As the battery cells 130 go through cycles of discharging and recharging, the chemical reaction inside the battery cells 130 may cause the battery cells 130 to swell or increase in volume. A chemical system of battery cell 130 may include one of a lithium cobalt oxide, nickel cobalt manganese, nickel cobalt aluminum, or other such chemical systems. In some examples, each battery cell 130 may also go through cycles of swelling and then shrinking (e.g., increasing and decreasing in volume) as it goes through the discharging and recharging cycles. If a battery cell 130 has an internal short circuit due to a defect or due to damage to the battery cell 130, the battery cell 130 may begin to heat, which in some cases may cause evaporation of the electrolyte. In some cases, damage to the battery cell 130 may result from physical penetration of the CWB 10. The electrolyte evaporation may, in turn, cause pressure to build up within the pouch cell portion. In some cases, if the pressure inside the pouch cell portion gets too high, the internal pressure of the battery cell 130 may cause a failure in the pouch cell portion (e.g., a thermal runaway condition) causing a flammable mixture that can include hot gases, molten materials, and in some cases a flame to escape through the seal of the battery cell 130. This flammable mixture coming from a failing battery cell 130 may propagate to an adjacent battery cell, which could cause the adjacent battery cell to also fail and possibly cascade to additional battery cells 130 causing them to fail. This failure of multiple battery cells 130 may cause the battery system (the CWB 10) to fail with a thermal runaway situation, and possibly cause a fire that could injure the user. In some cases, a thermal runaway situation may be caused by failure of a single battery cell 130.

To mitigate the risk of this flammable mixture of gases and flames escaping from a damaged battery cell 130 from causing thermal runaway propagation to other (e.g., adjacent) battery cells 130 via a fire, a fire-blocking foam member 150 may be installed adjacent to the first side 136 of each battery cell 130. By locating each fire-blocking foam member 150 adjacent the first side 136 of each battery cell 130, the fire-blocking foam member 150 may be adjacent the seal of the pouch cell portion to prevent any flammable gases or flames that escape through the seal of the pouch cell portion from affecting any adjacent battery cells 130. Accordingly, each battery cell 130 of the plurality of battery cells 130 on the flexible PCBA 100 may have a fire-blocking foam member 150 located adjacent the seal of the pouch cell portion. In the illustrated example, the battery cell 130 and the adjacent fire-blocking foam member 150 adjacent the first side 136 of the battery cell may define a battery cell module 144 as shown in FIGS. 9 and 10. In some cases, a fire-blocking foam member 150 may be arranged adjacent one or more of the first side, 136, the second side 138, the third side 140, or the fourth side 142 of a battery cell 130.

The fire-blocking foam members 150 may be formed from a silicone based material that is thermally insulating to help prevent the heat of any escaping gases or other material to affect another battery cell 130 in the CWB 10. Additionally, the fire-blocking foam members 150 may act as a flame resistant barrier by preventing any escaping flames from burning through it and affecting other battery cells 130 in the CWB 10. The fire-blocking foam members 150 may also be electrically insulating to prevent the fire-blocking foam members 150 from shorting any electrical connections between the battery terminals or any other connections on the PCB 110. In some examples, the fire-blocking foam member may be able to operate in temperatures ranging from −55° C. to 200° C. and may also be able to resist flames burning at over 1000° C. for short periods of time.

Each fire-blocking foam member 150 may have a generally cuboid shape, such as a rectangular cuboid shape or a substantially parallelepiped shape, although the fire-blocking foam member 150 could have a different shape in other examples. Each fire-blocking foam member 150 may cover most of a face of the seal or may cover substantially all of the entire face of the seal of the pouch cell portion on the first side 136 of its respective battery cell 130. For example, each fire-blocking foam member 150 may cover at least 95 percent of a surface area of the first side 136 of its respective battery cell 130, or may cover at least 90 percent of a surface area of the first side 136 of its respective battery cell 130. In addition, the fire-blocking foam member 150 may have a foam length 152 that is approximately equal (within +/−5 percent) to a battery width (BW) or within 80 percent of the battery width (BW), where the first battery width is the length of the first side 136 of its respective battery cell 130. Each fire-blocking foam member 150 may have a foam thickness of approximately 3 mm, or within a range of 1.5 mm and 5 mm. The foam thickness may be defined as the distance from a front side or inward facing surface 154 of the fire-blocking foam member 150 that faces the first side 136 of the battery cell 130 to a rear side or outward facing surface 156 opposite the inward facing surface 154. The foam thickness may also be expressed as a percentage of the spacing between adjacent battery cells. For instance, the foam thickness may be approximately 25 percent and 75 percent of the spacing between the first side 136 of a battery cell to the second side 138 of an adjacent battery cell 130 (the second battery cell spacing 160 described below). Furthermore, the fire-blocking foam member 150 may have a foam thickness that is less than the distance from the first side 136 of its respective battery cell 130 to a midpoint of the protrusion 28 located nearest the first side 136 the respective battery cell 130 to prevent the fire-blocking foam member 150 from encroaching the groove regions 20, 22. This arrangement may prevent the fire-blocking foam members 150 from impinging or resisting any flexing of the CWB 10.

Figure 6:
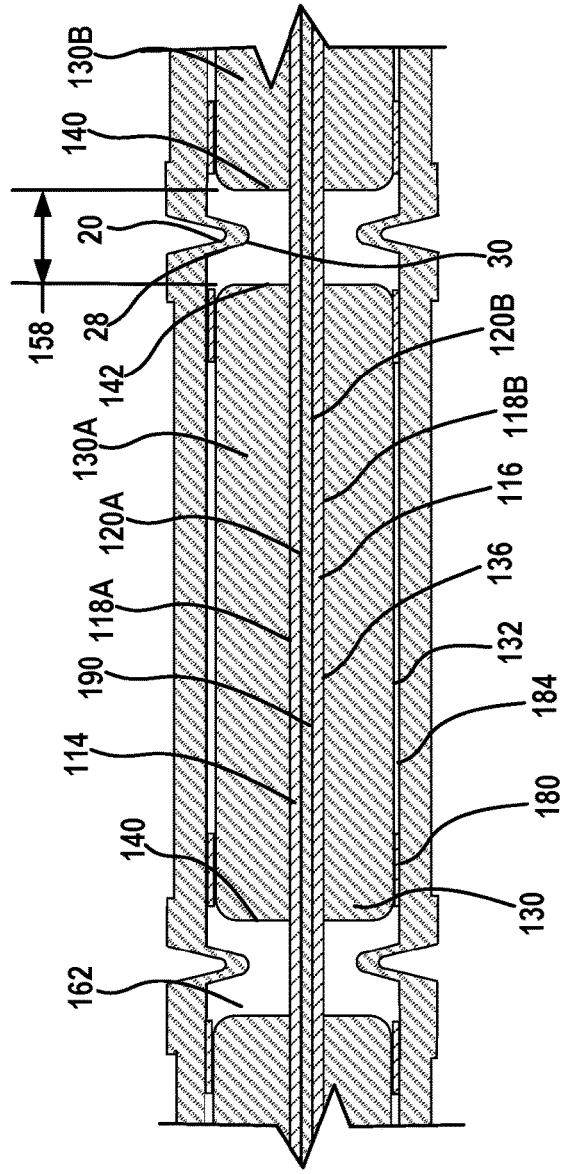
FIG. 6 illustrates a side cross-sectional view of the portable battery system of FIG. 1 along line 6-6 according to aspects described herein.

In addition, the spacing of the battery cells 130 within the CWB 10 may assist in preventing a thermal runaway condition, a fire, or possible flammable gases from spreading from a first battery cell 130 that has been damaged to an adjacent battery cell 130 that could cause the adjacent battery cell to fail. For instance, as shown in FIG. 6, a first battery cell spacing 158, in a generally horizontal direction, of a first battery cell 130A to a second battery cell 130B that may be defined as a distance from between the fourth side 142 of the first battery cell 130A to the third side 140 of a second adjacent battery cell 130B. The first battery cell spacing 158 may be a distance that is defined as a function of one or more variables, such as the battery cell width (BW), a bend radius of the CWB 10, a distance the edges of the CWB 10 move when the CWB 10 is in a deformed state, and a predetermined clearance around each battery cell 130. As an example, the first battery cell spacing 158 may be within a range of 2.0 mm and 3.5 mm. In some cases, the first battery cell spacing 158 may also be expressed as a percentage of the battery cell width (BW), a percentage of a bend radius of the CWB 10, a percentages of the distance the edges of the CWB 10 move when the CWB 10 is in a deformed state, a percentage of a predetermined clearance around each battery cell 130, or a percentage of a combination of one or more of variables identified above. For instance, the first battery cell spacing 158 may be approximately 9 percent of the width, BW, of a battery cell 130, or within a range of 6 percent and 11 percent of the width, BW, of a battery cell 130.

Figure 7:
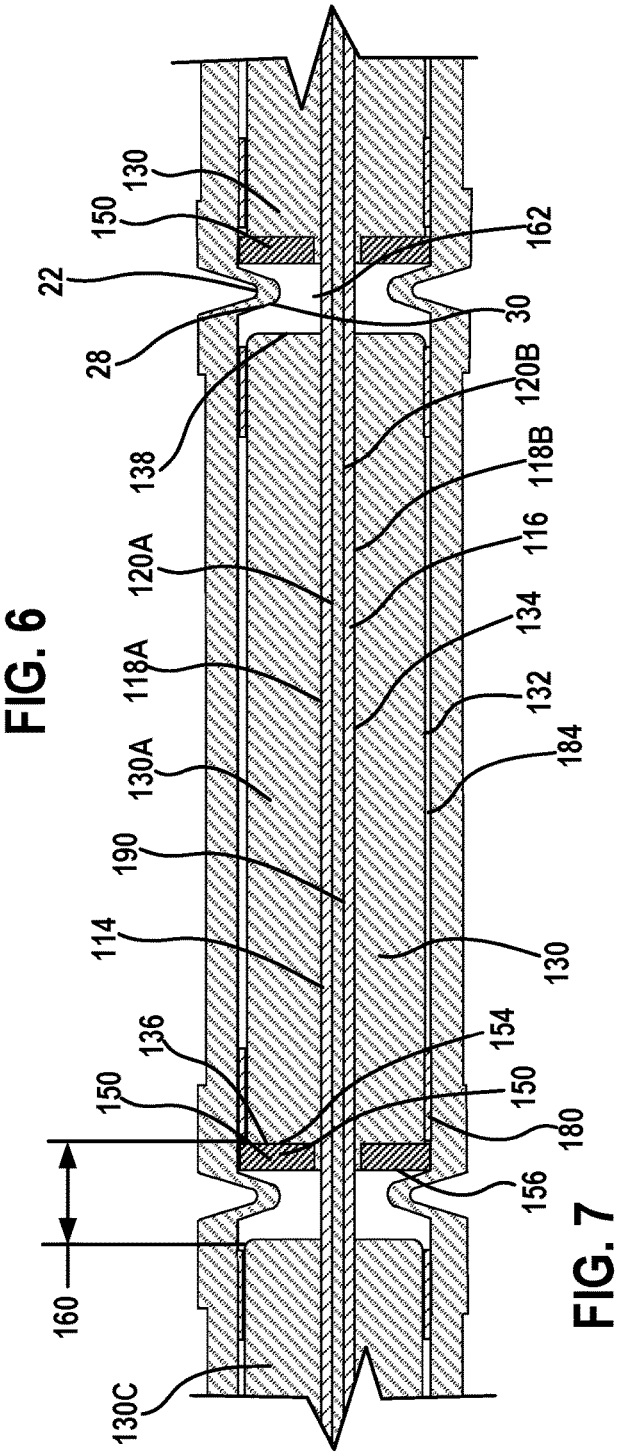
FIG. 7 illustrates a side cross-sectional view of the portable battery system of FIG. 1 along line 7-7 according to aspects described herein.

Additionally, as shown in FIG. 7, a second battery cell spacing 160, in a generally vertical direction, from a first battery cell 130A to a third adjacent battery cell 130C may have be defined as the shortest distance between the two adjacent battery cells 130A and 130C in a vertical direction (a direction parallel to a first side 136 to a second side 138 of a battery cell 130). The second battery cell spacing 160 may be distance that is defined as a function of one or more variables, such as the battery cell length (BL), a bend radius of the CWB 10, a distance the edges of the CWB 10 move when the CWB 10 is in a deformed state, and a predetermined clearance around each battery cell 130. As an example, the second battery cell spacing 160 may be a distance within a range of 5.0 mm and 8.5 mm. In some examples, the second battery cell spacing 160 may also be expressed as a percentage of the battery cell length (BL), a percentage of a bend radius of the CWB 10, a percentages of the distance the edges of the CWB 10 move when the CWB 10 is in a deformed state, a percentage of a predetermined clearance around each battery cell 130, or a percentage of a combination of one or more of variables identified above. For instance, the second battery cell spacing 160 may be approximately 16 percent of the battery cell length, BL, or within a range of 10 percent and 20 percent of the battery cell length, BL.

Battery cell spacing 158, 160 may help to prevent the flammable mixture escaping from the first battery cell 130A if it begins to fail from negatively affecting any of the adjacent battery cells 130B, 130C, while also allowing the CWB 10 to flex and bend to the desired amount and desired direction. In addition, the battery cells 130 arranged along the outer regions of the flexible PCBA 100 (i.e. the battery cells 130 with at least one side adjacent the edges of one of the housing members 14, 16) may also have similar spacing 158, 160 between the adjacent side and the corresponding edge of the respective housing member 14, 16. The spacing 158, 160 between the battery cells 130 creates gaps or spaces 162 around the battery cells 130 within the CWB 10. These gaps 162 are needed to allow the CWB 10 to flex and move the desired amount.

Each housing member 14, 16 may be flexible and may be formed from a polymeric material using an injection molding process or other technique known to one skilled in the art. Accordingly, each housing member 14, 16 may be flexible or bendable to be able to withstand repeated bending or flexing cycles to allow CWB 10 to meet the requirements of MIL-PRF-32383 CWB 10 may be required to flex at least 800 times under load to a 7 inch radius curved surface, such that an edge of the CWB 10 may be capable of deflecting, in each direction, at least a specified distance (i.e., 1 inch) from a centerline of the CWB 10 without sustaining physical or electrical damage. The housing members 14, 16 may be injection molded from a polymeric material that has elastomeric properties to allow the housing members 14, 16 that form the housing 12 to flex and bend. For example, the housing members 14, 16 may be formed from a thermoplastic elastomer (TPE), a thermoplastic urethane (TPU), thermoplastic vulcanizates (TPV), or other similar material.

In addition, the polymeric material forming the housing 12 may contain flame retardant additives to help prevent the housing 12 and/or the CWB 10 from catching on fire. In some examples, the housing may have a UL94 V-0 rating. These flame retardant additives may include: (a) phosphorus based compounds; (b) chlorinated or brominated compounds; (c) aluminum or magnesium hydroxides; (d) carbon based compounds; or (e) other flame retardant compounds.

In addition, the upper housing member 14 and the lower housing member 16 may include a plurality of vertically oriented grooves 20 and a plurality of horizontally oriented grooves 22 that are arranged on the front walls 24, 26, of the respective upper housing member 14 and the lower housing member 16. The vertically oriented grooves 20 and horizontally oriented grooves 22 may be substantially perpendicular to each other and may also intersect each other. For instance, as shown in FIGS. 1-3, the front wall 24 of the upper housing member 14 and the front wall 26 of the lower housing member 16 may both include a pair of vertically oriented grooves 20 that are oriented parallel to each other, and a pair of horizontally oriented grooves 22 that are also oriented parallel to each other, such that the pair of vertically oriented grooves 20 intersect the pair of horizontally oriented grooves 22. Each of the grooves 20, 22 may form protrusions 28 on the interior of its respective housing member 14, 16. The protrusions 28 of the intersecting pairs of grooves 20, 22 may form a perimeter wall 30 along the interior of its respective housing member 14, 16 around an internal receiver 32 receives and/or at least partially surrounds a battery cell module 144. The protrusions 28 may have an angled surface that slopes away from the battery cell module 144 received in the internal receiver 32 formed by the perimeter wall 30. The perimeter wall 30 may have a perimeter wall height that is approximately 50 percent of a height, BH, of a battery cell 130, where the perimeter wall height is defined a distance from an outer surface of the corresponding front wall 24, 26 of the respective housing member 14, 16 to an uppermost edge of the protrusion 28 formed by its respective groove 20, 22. In some examples, the perimeter wall height may be within a range of 35 percent and 65 percent of the height, BH, of a battery cell 130.

In some cases, the battery cells 130 may have a plurality of battery cell shock-attenuating members 180 individually attached to the front side 132 of each battery cell 130. Each battery cell shock-attenuating member 180 may have an opening 182 extending through the thickness of the battery cell shock-attenuating member 180. In some examples, the battery cell shock-attenuating member 180 may also have thermal insulating properties that may help prevent heat from a failing battery cell 130 from affecting an adjacent battery cell 130. Each opening 182 may create a cavity 184 between the respective front side 132 of the battery cell 130 and one of the interior surfaces of the housing members 14, 16. The cavity 184 may provide room for a battery cell 130 to expand into the cavity 184 to prevent any swelling induced stress on the battery cell 130 as it expands. In some examples, the opening 182 may not extend through the entire thickness of the battery cell shock-attenuating member 180 creating cavity 184 within the battery cell shock-attenuating member 180. As shown in the illustrated example, the opening 182 may have an oval shape or may have a different shape such as a rectangular shape, circular shape, or other geometric shape. The rear surface of each battery cell shock-attenuating member 180 may be affixed the front side 132 of each respective battery cell 130 with an adhesive, such as a glue, an epoxy, an acrylic, or a tape.

In addition, a central shock-attenuating member 190 may be positioned between the upper and lower portions 114, 116 of the folded PCB 110 and may also contact the inward facing surfaces of the PCB 110. The central shock-attenuating member 190 may compress to absorb any impacts or forces that are received by the CWB 10. The central shock-attenuating member 190 may be a continuous layer free of openings or holes that extend through the central shock-attenuating member 190 in the region that corresponds to the PCB 110. The central shock-attenuating member 190 may also serve to electrically insulate the upper and lower portions 114, 116 from each other. In some examples, the central shock-attenuating member 190 may also have thermal insulating properties to help prevent heat from a failing battery cell 130 transferring to a battery cell 130 on an opposite side of the PCB 110 from the failing battery cell 130. The central shock-attenuating member 190 may be affixed to one or both of the inward facing surfaces of the folded PCB 110 with an adhesive, such as with a glue, an epoxy, an acrylic, or a tape. In some examples, the central shock-attenuating member 190 may be free floating between the inward facing surfaces or only attached along its perimeter.

The central shock-attenuating member 190 and the battery cell shock-attenuating members 180 may be formed from a visco-elastic material that can attenuate shock and vibration while also having electrically insulating properties. In addition, the shock-attenuating members 180, 190 may be compressible to assist in absorbing any swelling from the battery cells 130. The visco-elastic material may be formed from a polymeric material such as a polyurethane based material such as Poron®, Sorbothane® or similar material. In some cases, the visco-elastic material may comprise glass-reinforced epoxy laminate material, such as FR4 or similar material, or may comprise an acrylic foam tape, such as VHB™ or similar material. In some cases, the visco-elastic material may be thermally insulating to prevent heat from a first battery cell 130 affecting another battery cell 130 within the CWB 10. The central shock-attenuating member 190 and/or the battery cell shock-attenuating members 180 may be formed from the same material or, in some examples, formed from different materials. The material forming the central shock-attenuating members and/or the battery cell shock-attenuating members 180 may be a polymeric foam (i.e., porous) or a solid polymeric material. The central shock-attenuating members and/or the battery cell shock-attenuating members 180 may be formed from a sheet of material and then cut to the final shape using a die cutting, laser cutting, water-jet cutting process, or other cutting process known to one skilled in the art. The central shock-attenuating members 190 and/or the battery cell shock-attenuating members 180 may have a constant thickness, where the thickness of the central shock-attenuating member 190 may substantially the same thickness (i.e., within 10 percent) as a thickness of at least one of the plurality of battery cell shock-attenuating members 180.

The flexible PCB 110 for the CWB 10 according to aspects of the present disclosure may be configured to provide power and/or electrical signals from a plurality of battery cells 130 and/or other components of a CWB 10. The flexible PCB 110 may be formed of one or more of a flexible polymer or plastic material, such as a polyimide or other such flexible substrate. In some cases, markings showing locations of placement of battery cells may be formed through a silk screening process or other like method. Electrical conductors may be included in one or more layers of the flexible PCB 110. In some cases, electrical conductors may be configured as a conductive pattern (e.g., a copper overlay, a conductive ink, etc.) on the surface of the substrate of the flexible PCB 110. In some cases, exposed conductive features (e.g., conductors, a bare copper surface, a bare aluminum surface, etc.) may be coated with a coverlay substance, such as an electrical insulator. For conductive portions of the flexible PCB not covered with a coverlay, the surface may be plated, such as with an electroless nickel immersion gold (ENIG) finish, a lead-free immersion silver finish or other substances with improved conductive properties. The flexible PCB 110 may have a plurality of physical connection sections disposed in a grid like pattern, where each of the plurality of battery cells 130 is physically affixed to the flexible PCB 110 at a corresponding physical connection section of the plurality of physical connection sections. In an illustrative example, the rear side 134 of each battery cell 130 of the plurality of battery cells may be physically affixed to the flexible PCB 110 at a corresponding physical connection section.

Figure 8:
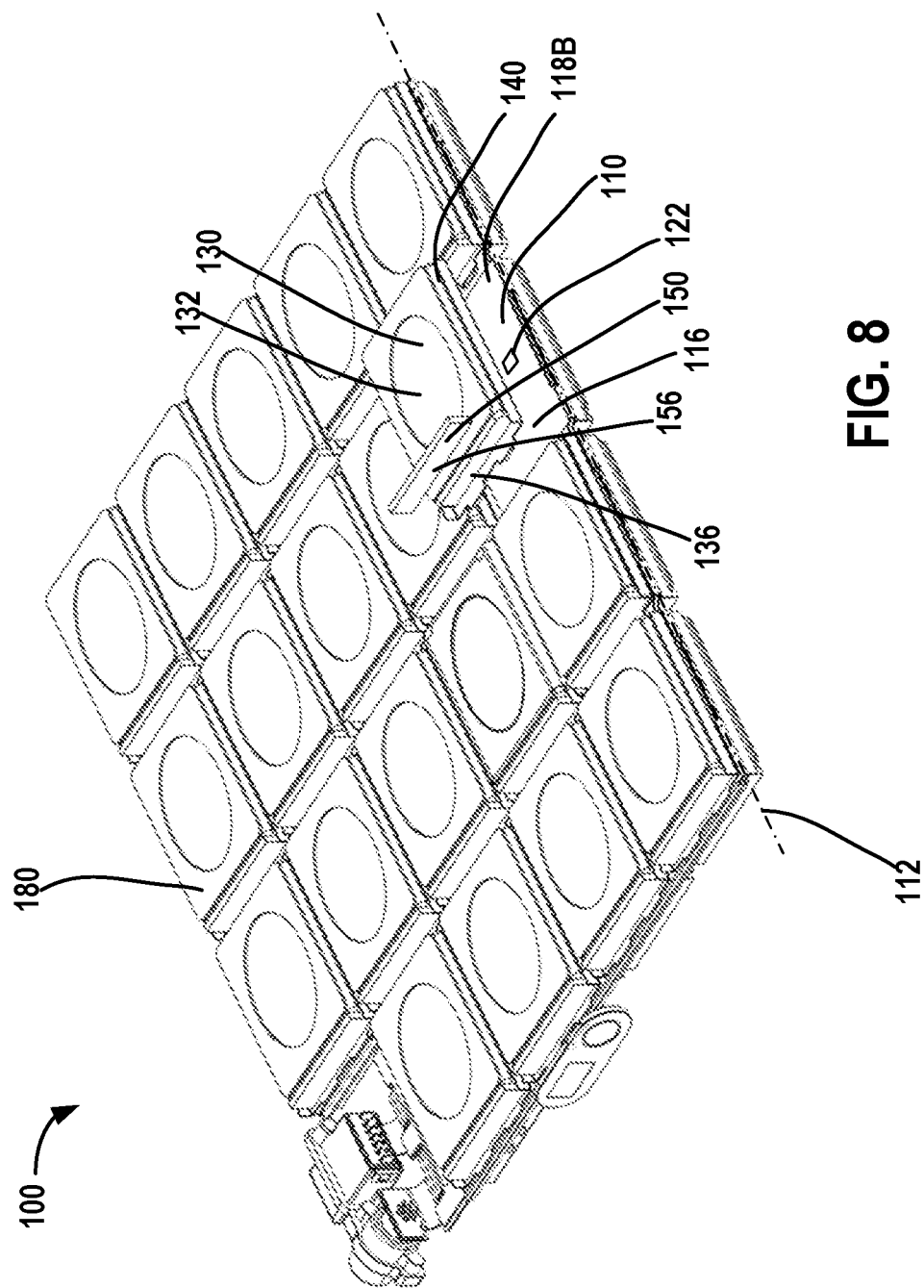
FIG. 8 illustrates a partially exploded perspective view of a printed circuit board assembly of the portable battery system of FIG. 1 according to aspects described herein.

In addition, the flexible PCB 110 may also include a plurality of fuses 122, where each fuse 122 may be arranged on the PCB 110 to be connected electrically with a particular battery cell 130. Thus, each battery cell 130 of the plurality of battery cells 130 may have an individual fuse 122 that corresponds with a particular battery cell 130. As such, the number of fuses 122 may be the same as the number of battery cells 130. In some cases, excessive current flow to or from a battery cell 130 may be symptomatic of a failure condition and/or may be a cause of a failure condition. For example, if a battery cell 130 overheats or begins to fail, the battery cell 130 may have a current flow either entering to or exiting from the failing battery cell 130 that is greater than a predetermined current flow limit for the battery cell 130. Accordingly, when the current flow is greater than the predetermined current limit, the fuse corresponding to the failing battery cell 130 opens to shut off an electrical connection between the failing battery cell 130 and the flexible PCB 110. For instance, the fuse 122 may be a surface mount fuse, a trace fuse, or another fuse package type. In an illustrative example, the fuse 122 may be a trace fuse made of a conductive material (e.g., copper) having a cross-sectional area (e.g., thickness and width) designed to open (i.e. blow, or fail) when conducting current approximately at a predetermined current flow value. In some examples, the fuse 122 may be formed in a 2 ounce copper layer and having a width of approximately 0.127 mm+/− 0.025 mm. As the electrical connection is shut off to the overheated battery cell 130, the risk of a fire being caused the overheated or venting battery cell 130 is reduced. As shown in FIG. 8, a fuse 122 may be physically located anywhere on the PCB 110 and adjacent to a point of an electrical connection of a particular battery cell 130 to establish the electrical connection of the particular battery cell 130 to a power bus of the flexible PCBA 100.

Figure 12:
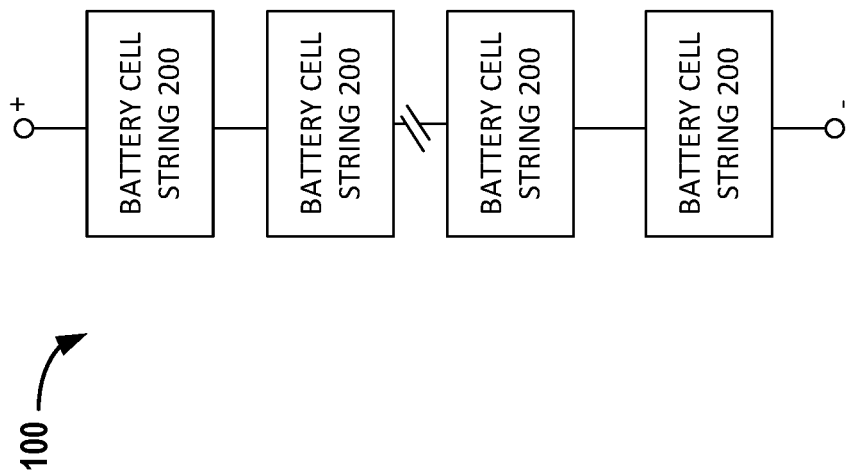
FIG. 12 illustrates a schematic of a plurality of battery cell strings of a printed circuit board assembly of the portable battery system of FIG. 1 according to aspects described herein.
Figure 11:
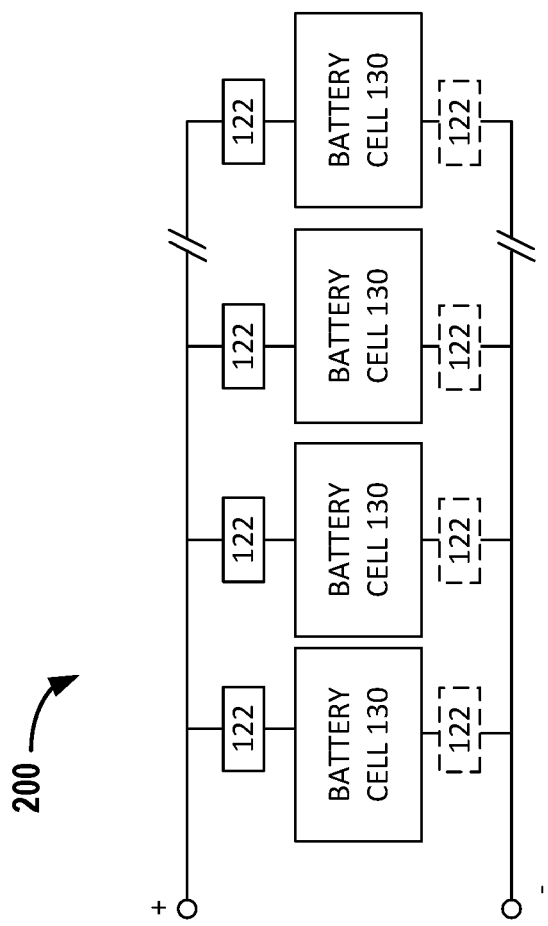
FIG. 11 illustrates a schematic of a battery cell string of a printed circuit board assembly of the portable battery system of FIG. 1 according to aspects described herein.

As discussed above, the flexible PCBA 100 may have a plurality of battery cells 130 attached to the PCB 110. The battery cells 130 may be arranged such that a predetermined number of battery cells 130 (e.g., two or more) are electrically connected in parallel to define a battery cell string 200 as shown in FIG. 11. The flexible PCBA 100 (e.g., the battery system or CWB 10) may have a plurality of battery cell strings 200 (e.g., two or more) that are electrically connected in series as shown in FIG. 12. By arranging the battery cells 130 in this manner, the flexible PCBA 100 and the CWB 10 may be able to provide an operational voltage and current level as designed. In some cases, each battery cell 130 may be individually fused with one or more fuses 122 such that the operational voltage may be provided even during conditions when a battery cell 130 fails, such as from either damage or an internal defect.

For example, each battery cell string 200 may comprise a plurality of battery cells 130 arranged in a parallel circuit such that if a single battery cell 130 fails, such as with a catastrophic failure as described above, the fuse 122 connected to the anode or the cathode (or fuses 122 connected to each of the anode and the cathode) of the failing battery cell 130 may open to electrically isolate the failing battery cell 130 from the other battery cells 130 within the battery cell string 200 such that a thermal runaway condition of the failed battery cell 130 does not propagate to other adjacent or electrically connected battery cells. In some cases, when the failing battery cell 130 is electrically disconnected from the string, electrical current may flow through remaining battery cells 130 of the string that are arranged in parallel to ensure power flow continues from the remaining battery cells of the battery cell string 200. By electrically isolating the failing battery cell 130, the remaining battery cells 130 within the battery cell string 200 remain active and intact. Without the fuse 122 to electrically isolate the failing battery cell 130, the entire battery cell string 200 may drain quickly through the failing battery cell 130, where heat generated via the electrical current may facilitate a thermal runaway condition. This draining of the entire battery cell string 200 may destroy multiple battery cells of the battery cell string 200, which would cause the battery system (CWB) 10 to fail or the battery system (CWB) 10 to operate at a voltage lower than the desired operational level. The individual fusing of each battery cell 130 may allow the plurality of battery cell strings 200 to function and may allow the battery system (CWB) 10 to remain operational after a battery cell 130 fails either from an internal defect or physical damage caused by an impact or penetration of housing 12 or of the battery system 10. In some cases, a failed battery cell 130 may cause the battery system 10 to lose some capacity, while the battery system 10 maintains an operational current and voltage level within specified levels.

Figure 4:
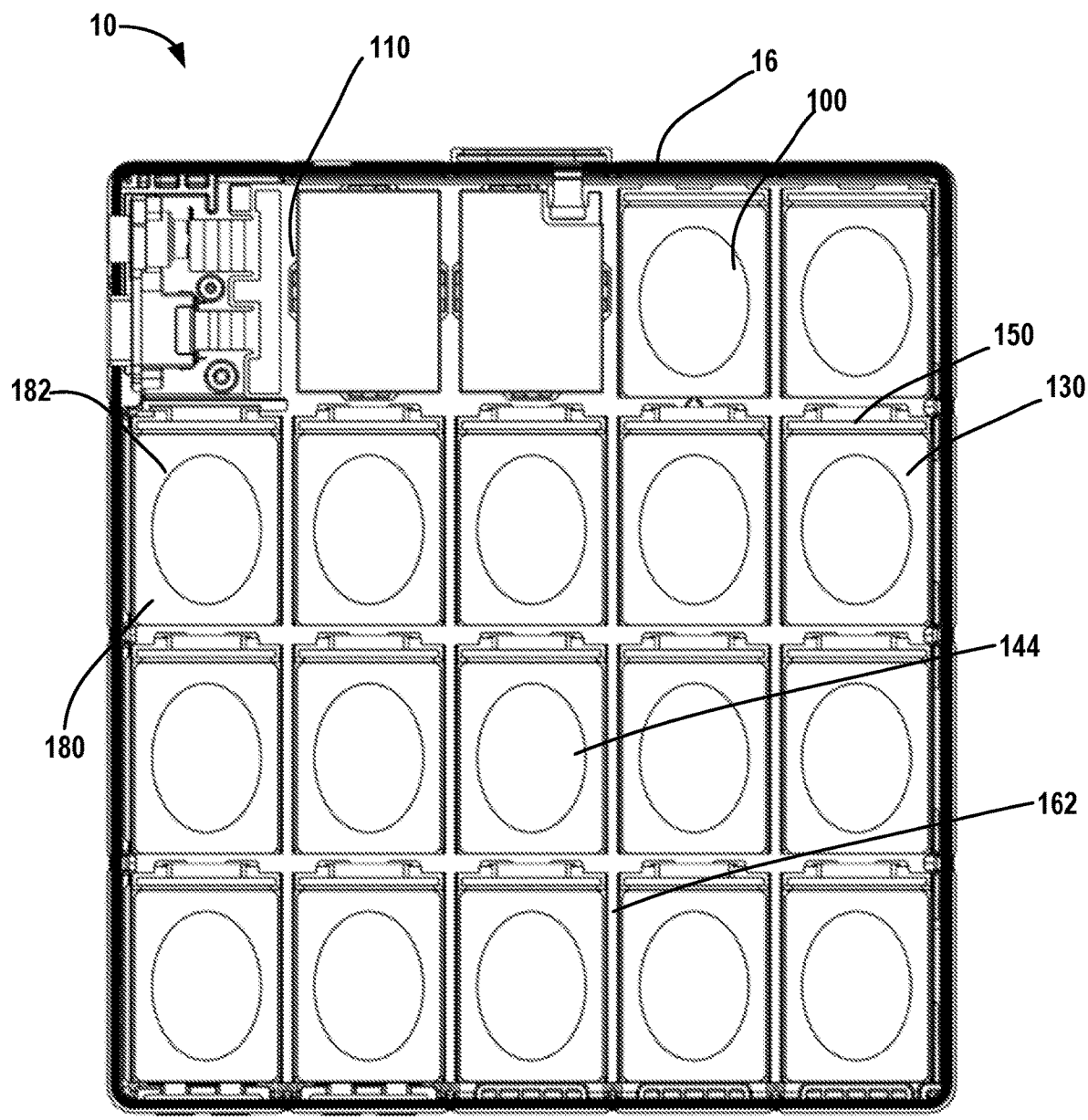
FIG. 4 illustrates a front view of the portable battery system of FIG. 1 with an upper housing member removed according to aspects described herein.
Figure 5:
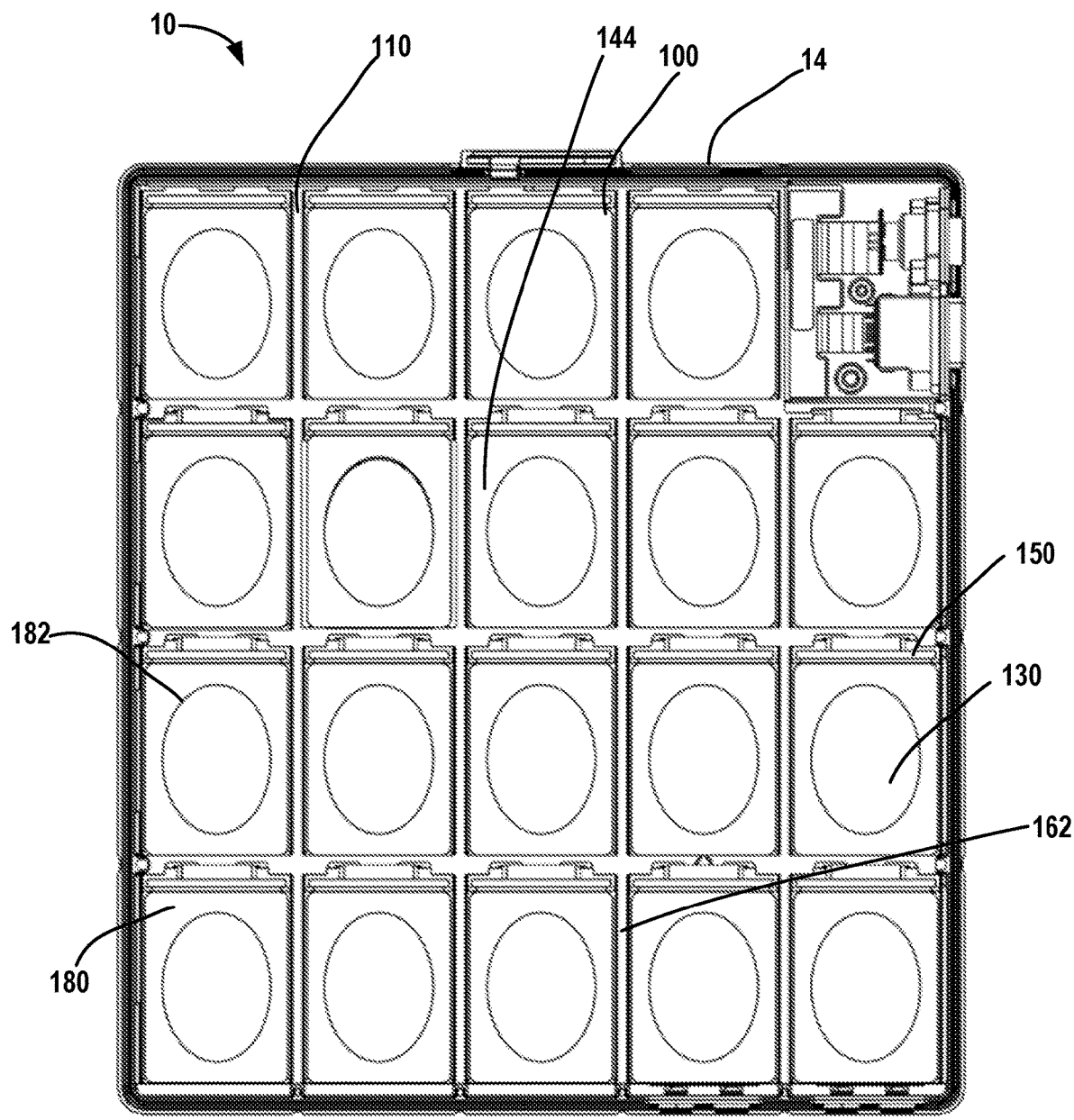
FIG. 5 illustrates a rear view of the portable battery system of FIG. 1 with a lower housing member removed according to aspects described herein.

In an example, each battery cell string 200 may be comprised of a number of battery cells (e.g., 9 battery cells) and the battery system 10 may comprise one or more battery strings (e.g., 4 battery cell strings 200). As shown in the illustrated example of FIGS. 4 and 5, the PCBA 100 may include 36 battery cells 130 that are arranged as four battery cell strings 200. Each battery cell string 200 has nine battery cells 130 arranged in parallel. The four battery cell strings 200 may be connected in series to provide a defined output. If a fuse 122 connected to a first battery cell in one of the four battery cell strings 200 opens, then the current to the first battery cell is shut off. The current through the string 200 may continue to flow through the remaining eight parallel-connected battery cells in the battery cell string. Thus, the PCBA 100 (and the CWB 10) is still able to operate with 35 battery cells 130. In other examples, each battery cell string 200 may comprise any number of battery cells 130, such as 4 battery cells, 5 battery cells, 6 battery cells, 7 battery cells, 8 battery cells, 10 battery cells, or more than 10 battery cells. Similarly, the battery system 10 may comprise any number of battery cell strings 200, such as 2 battery strings, 3 battery strings, 5 battery strings, 6 battery strings or more than 6 battery strings. The electrical connection of the battery cells 130 and the fuses 122 may work in conjunction with the fire-blocking foam members 150, and the battery cell spacing 158, 160 to create a robust passive thermal management system for a CWB 10.

Aspects of the disclosure have been described in terms of illustrative examples thereof. Numerous other examples, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A conformal wearable battery comprising:
   a flexible printed circuit board assembly (PCBA) comprising:
   a flexible printed circuit board (PCB);
   a plurality of battery cells connected to the flexible PCB in a grid-like pattern, wherein each battery cell of the plurality of battery cells comprising a front side, a rear side opposite the front side, a first side extending between the front side and the rear side, a second side opposite the first side, a third side extending between the first side and the second side, and a fourth side opposite the third side and wherein each battery cell of the plurality of battery cells is a non-cylindrical lithium-ion pouch cell comprising a seal on the first side of each battery cell,
   wherein a first battery cell spacing from the fourth side of a first battery cell to the third side of a second battery cell adjacent to the first battery cell is within a range of 6 percent and 11 percent of a width of the first battery cell;
   a plurality of fire-blocking foam members, wherein each fire-blocking foam member of the plurality of fire-blocking foam members is located adjacent to the seal on the first side of a corresponding battery cell of the plurality of battery cells, and wherein each fire-blocking foam member has an inward facing surface that faces the first side of the corresponding battery cell and an outward facing surface opposite the inward facing surface defining a foam thickness, wherein each fire-blocking foam member has a surface area that covers at least 90 percent of the first side of the corresponding battery cell; and
   a fuse arranged on the PCB for each battery cell connected to the PCB, wherein when the first battery cell has a current flow greater than a predetermined current flow limit, a first fuse corresponding to the first battery cell opens to shut off an electrical connection between the first battery cell and the PCB,
   wherein each fire-blocking foam member is one or both of thermally insulating and electrically insulating; and
   a housing that receives the PCBA, wherein the housing is formed from a polymeric material comprising a flame retardant additive, and wherein a wall of the housing includes a first channel and a second channel oriented parallel to each other, and a third channel and a fourth channel that intersect the first and second channels, wherein the first channel, the second channel, the third channel, and the fourth channel have interior surfaces that form a perimeter wall around an internal receiver in the housing that receives the first battery cell of the plurality of battery cells; and wherein a second battery cell spacing defined as a shortest distance between the first side of the first battery cell to a second side of a third battery cell adjacent to the first battery cell, and the foam thickness is within a range of 25 percent and 75 percent of the second battery cell spacing.

2. The conformal wearable battery of claim 1, wherein each fire-blocking foam member has a generally cuboid shape.

3. The conformal wearable battery of claim 1, wherein a first battery terminal and a second battery terminal extend from the first side of each battery cell.

4. The conformal wearable battery of claim 1, wherein each fire-blocking foam member is both thermally insulating and electrically insulating.

5. The conformal wearable battery of claim 1, wherein each fire-blocking foam member is formed from a silicone based material.

6. A conformal wearable battery comprising:
a flexible printed circuit board assembly (PCBA) comprising:
a flexible printed circuit board (PCB);
a plurality of battery cells connected to the flexible PCB in a grid-like pattern, each battery cell of the plurality of battery cells has a front side, a rear side opposite the front side, a first side extending between the front side and the rear side, a second side opposite the first side, a third side extending between the first side and the second side, and a fourth side opposite the third side and wherein each battery cell of the plurality of battery cells comprises a non-cylindrical lithium-ion pouch cell comprising a seal on the first side of each battery cell;
wherein a first battery cell spacing from the fourth side of a first battery cell to the third side of a second battery cell adjacent to the first battery cell is within a range of 6 percent and 11 percent of a width of the first battery cell;
a fuse arranged on the PCB for each battery cell of the plurality of battery cells on the PCBA, wherein when the first battery cell of the plurality of battery cells has a current flow greater than a predetermined current flow limit, a first fuse corresponding to the first battery cell opens to shut off an electrical connection between the first battery cell and the PCB;
a plurality of fire-blocking foam members, wherein each fire-blocking foam member of the plurality of fire-blocking foam members is located adjacent to the seal on the first side of a corresponding battery cell, wherein each fire-blocking foam member has an inward facing surface that faces the first side of the first battery cell and an outward facing surface opposite the inward facing surface defining a foam thickness, wherein each fire-blocking foam member has a surface area that covers at least 90 percent of the first side of the corresponding battery cell; and
a housing that includes a housing member and an interior cavity that receives the PCBA, wherein the housing member is formed from a polymeric material comprising a flame retardant additive, and wherein a wall of the housing member includes a first channel and a second channel oriented parallel to each other, and a third channel and a fourth channel that intersect the first and second channels, wherein the first channel, the second channel, the third channel, and the fourth channel have interior surfaces that form a perimeter wall around an internal receiver in the housing member that receives the first battery cell of the plurality of battery cells; and
wherein a second battery cell spacing defined as a shortest distance between the first side of the first battery cell to a second side of a third battery cell adjacent to the first battery cell, and the foam thickness is within a range of 25 percent and 75 percent of the second battery cell spacing.

7. An electronic system comprising:
an upper housing member;
a lower housing member that connects to the upper housing member forming an interior cavity; wherein the upper housing member and the lower housing member are formed from a polymeric material comprising a flame retardant additive;
a printed circuit board assembly (PCBA) received within the interior cavity comprising:
a flexible printed circuit board (PCB);
a plurality of battery cells connected to the flexible PCB in a grid-like pattern, wherein each battery cell of the plurality of battery cells has a front side, a rear side opposite the front side, a first side extending between the front side and the rear side, a second side opposite the first side, a third side extending between the first side and the second side, and a fourth side opposite the third side, and wherein each battery cell of the plurality of battery cells comprises a non-cylindrical lithium-ion pouch cell comprising a seal on the first side of each battery cell;
wherein a first battery cell spacing from the fourth side of a first battery cell to the third side of a second battery cell adjacent to the first battery cell is within a range of 6 percent and 11 percent of a width of the first battery cell;
wherein the rear side of each battery cell of the plurality of battery cells is physically affixed to the PCB;
a first group of battery cells of the plurality of battery cells electrically connected in parallel forming a first battery cell string;
a second group of battery cells of the plurality of battery cells electrically connected in parallel forming a second battery cell string;
wherein the first group of battery cells and the second group of battery cells are connected in series; and
a plurality of fuses arranged on the PCB, wherein each battery cell is connected to an individual fuse of the plurality of fuses, wherein when the first battery cell of the first battery cell string has a current flow greater than a first predetermined current flow limit, a first fuse of the plurality of fuses corresponding to the first battery cell of the first battery cell string opens to shut off an electrical connection between the first battery cell of the first battery cell string and the PCB; and
a plurality of fire-blocking foam members, wherein each fire-blocking foam member of the plurality of fire-blocking foam members is located adjacent to the seal on the first side of a corresponding battery cell of the plurality of battery cells, wherein each first fire-blocking foam member has an inward facing surface that faces the first side of the first battery cell and an outward facing surface opposite the inward facing surface defining a foam thickness, wherein each fire-blocking foam member has a surface area that covers at least 90 percent of the first side of the corresponding battery cell; and wherein a wall of the upper housing member includes a first channel and a second channel oriented parallel to each other, and a third channel and a fourth channel that intersect the first and second channels, wherein the first channel, the second channel, the third channel, and the fourth channel have interior surfaces that form a perimeter wall around an internal receiver in the upper housing member that receives the first battery cell of the plurality of battery cells; and wherein a second battery cell spacing defined as a shortest distance between the first side of the first battery cell to a second side of a third battery cell adjacent to the first battery cell, and the foam thickness is within a range of 25 percent and 75 percent of the second battery cell spacing.

8. The electronic system of claim 7, wherein when a second battery cell of the second battery cell string has a current flow greater than a second predetermined current flow limit, a second fuse corresponding to the second battery cell of the second battery cell string opens to shut off an electrical connection between the second battery cell of the second battery cell string and the PCB.

9. The electronic system of claim 8, wherein the first predetermined current flow limit is equal to the second predetermined current flow limit.

10. The electronic system of claim 7, wherein a perimeter wall height is within a range of 35 percent and 65 percent of a height of the first battery cell.

\* \* \* \* \*